United States Patent Office 3,739,011
Patented June 12, 1973

3,739,011
CATALYTIC ISOMERIZATION OF 2-METHYL-3-BUTENENITRILE TO LINEAR PENTENENITRILES
William Charles Drinkard, Jr., Wilmington, Del., assignor to E. I. du Pont de Nemours and Company, Wilmington, Del.
No Drawing. Continuation-in-part of abandoned application Ser. No. 876,613, Nov. 13, 1969. This application Apr. 30, 1971, Ser. No. 139,202
Int. Cl. C07c 121/30
U.S. Cl. 260—465.9
10 Claims

ABSTRACT OF THE DISCLOSURE

A process for isomerization of 2-methyl-3-butenenitrile to linear pentenenitriles by means of certain zero valent nickel complexes such as $Ni(PR_3)_3$ and $Ni(PR_3)_4$ wherein "R" is an alkyl or aryl group. A combination of a promoter such as cation of a metal and excess ligand such as triphenylphosphine may be used with the nickel complex.

RELATED APPLICATIONS

This application is a continuation-in-part of patent application, Ser. No. 876,613, filed on Nov. 13, 1969 by William Charles Drinkard, Jr., now abandoned.

BACKGROUND OF THE INVENTION

The hydrocyanation of an ethylenically unsaturated organic compound such as butadiene or 2-methyl-3-butenenitrile in the presence of certain zero valent nickel complexes such as $Ni(MR_3)_3$ or $Ni(MR_3)_4$ wherein M is phosphorous, arsenic or antimony and R is an alkyl or aryl group is described and claimed in copending application Ser. No. 876,613 referred to above.

The process of isomerization of 2-methyl-3-butenenitrile is not specifically disclosed in Ser. No. 876,613 but essential operating conditions for the same are set forth in Example 56 of that application. In that example 2-methyl-3-butenenitrile is hydrocyanated to give a mixture of products including adiponitrile, which product could not have been realized without isomerization of 2-methyl-3-butenenitrile to either 3-pentenenitrile or 4-pentenenitrile or a mixture of both prior to reaction with hydrogen cyanide.

It is the purpose of this application to make claim to a process of isomerizing 2-methyl-3-butenenitrile to linear pentenenitriles in the presence of certain of the zero valent complexes described in Ser. No. 876,613.

SUMMARY OF THE INVENTION

This invention provides a method of preparing linear pentenenitriles by contacting 2-methyl-3-butenenitrile with a zero valent nickel complex having the formula $Ni(PR_3)_3$ or $Ni(PR_3)_4$ or mixtures of these, "R" being an alkyl, aryl or substituted aryl group, at a temperature in the range of 0° C. to 250° C. and preferably 20° C. to 150° C. The "R" group may have up to 18 carbon atoms and in a given $PR_3$ the "R" groups may be cojoined and may be the same or different.

The complexes may be preformed or they may be prepared in situ. One method of in situ synthesis involves the use of a divalent nickel compound with a $PR_3$ ligand and a reducing agent such as magnesium, aluminum, manganese, iron, zinc, cadmium, indium, tin, cerium, thorium, calcium or an alkyl aluminum compound. The catalysts of this type may also be prepared in situ from an organo-nickel compound and a $PR_3$ ligand as well as from a zero valent nickel complex of a sigma-pi bonding ligand and an organophosphine. Sigma-pi type bonding is described, for example, in Cotton and Wilkinson (Advanced Inorganic Chemistry, Interscience Publishers, 1962, pp. 602–606). It is not entirely certain what unseparated reaction products are formed in the reaction mixture by the in situ preparation process, although zero-valent nickel is believed always to be present in the form of a $Ni(PR_3)_3$ or $Ni(PR_3)_4$ complex, a mixture of both or $Ni(PR_3)_3$ associated with reagent or reactant molecules.

The ligands useful in forming the complexes of this invention are of the structure $PR_3$, wherein R is an alkyl, aryl or substituted aryl group containing up to 18 carbon atoms. As indicated above, the R groups in a given $PR_3$ may be the same or different, such as $P(C_6H_5)_3$, $P(CH_3)(C_6H_5)_2$, $P(C_6H_5)_2(C_6H_4CH_3)$, $P(C_6H_4Cl)_3$ or $P(CH_3)_3$. The aryl groups may be substituted with alkyl, halogen or other groups provided the groups do not interfere with the catalyst function. The isomerization can be carried out by using the zero valent nickel complex with a promoter for the complex or with an excess of the ligands used in making the nickel complex or with both a promoter and excess ligand.

The promoter generally is a cationic form of a metal selected from the class of zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, palladium, thorium, iron and cobalt. Among these the cations of zinc, cadmium, titanium, tin, chromium, iron and cobalt are preferred. Suitable promoters of this type are salts of the metals listed above and include aluminum chloride, zinc chloride, cadmium, iodide, titanium trichloride, titanium tetrachloride, zinc acetate, ethyl aluminum dichloride, chromic chloride, stannous chloride, zinc iodide, nickel chloride, cerous chloride, cobaltous iodide, cadmium chloride, molybdenum dichloride, zirconium chloride, thorium chloride, ferrous chloride, and cobaltous chloride. Preferably, these compounds should be at least partially soluble in the system and also preferably should not have an oxidizing tendency since this generally results in at least partial loss of the nickel catalyst.

The anion portion of the compound is preferably selected from the class consisting of halide, i.e., fluoride, chloride, bromide, an iodide; anions of lower fatty acids of from 2 to 7 carbon atoms, $HPO_3^{-2}$, $H_2PO_2^-$, $CF_3COO^-$, $C_7H_{15}OSO_2^-$, and $SO_4^{-2}$, etc. Useful organometallic compounds include $(C_2H_5)_3Al_2Cl_3$, and $C_2H_5AlCl_2$. The promoter acts to improve the catalyst life, and in certain cases, the rate. The amount of promoter used generally can be varied from about 1:20 to 50:1 molar ratio of promoter to catalyst. The promoter may be used according to several techniques. Thus, while at least some of the promoter may be added to the reaction mixture at the start of the reaction, additional amounts may be added at any point in time during the reaction, or the promoter may be formed during in situ preparation of the nickel complex.

Also useful as a promoter in the hydrocyanation reaction described above are boron compounds comprising borohydrides and organoboron compounds of the formula $B(R^1)_3$ wherein $R^1$ is of the class consisting of hydrogen, aryl radicals of from 6 to 18 carbon atoms, aryl radicals substituted with groups that do not interfere, lower alkyl radicals of from 1 to 7 carbon atoms and lower alkyl radicals of from 1 to 7 carbon atoms substituted with a cyano radical. Generally, the case where $R^1$ is phenyl or phenyl substituted with an electronegative radical such as —F or —$CF_3$ is preferred. The borohydrides are the alkali metal borohydrides, such as sodium borohydride and potassium borohydride, and the quaternary ammonium borohydrides particularly the tetra (lower alkyl) ammonium borohydrides and borohydrides of the formula $B_nH_{n+4}$ where $n$ is an integer from 2 to 10, and $B_mH_{m+6}$ where $m$ is an integer from 4 to 10.

The ligands used in excess are defined as in the nickel complexes above. The preferred excess ligands are the aryl phosphines. Generally, the excess ligand is present in at least a one molar and preferably a two molar excess as based on the nickel complex present. The only limit of excess ligand involves practical considerations for it may even be used as the solvent. However, generally there is little advantage to be obtained in using over a 300 mole excess of ligand as based on one mole of nickel, since the rate of the displacement reaction becomes too slow to be practical due to the decreased concentration of nickel present. This use of excess ligand extends catalyst life by its stabilizing effect on the catalyst system. The extent of stabilization is dependent on the temperature and on the amount of excess ligand present. The excess ligand used may be the same or different from the ligand attached to nickel in the intermediate nickel compound and mixtures of different ligands can be used.

The process of the invention is normally carried out at atmospheric pressure and at any temperature in the range 0°–250° C., preferably in the range 20–150° C. The pressure is not critical, however, and can be above or below atmospheric pressure if desired. Any of the conventional batch or continuous flow procedures may be used either in the liquid phase or in the vapor phase (with respect to the relatively volatile 2-methyl-3-butenenitrile reactant and linear pentenenitrile products). The reactor may be of any mechanically and chemically resistant material, and is usually of glass or an inert material or alloy, e.g., nickel, copper, silver, gold, platinum, stainless steel, Monel®, Hastelloy®, etc.

The process is usually carried out without an added diluent or solvent. Any solvent or diluent that is nondestructive of the catalyst can be used, however. Suitable solvents include aliphatic or aromatic hydrocarbons (hexane, cyclohexane, benzene), ethers (diethyl ether, tetrahydrofuran, dioxane, glycol dimethyl ether, anisole), esters (ethyl acetate, methyl benzoate), nitriles (adiponitrile, benzonitrile), etc.

A nonoxidizing environment is desirable in order to retard oxidative deactivation of the catalyst. Accordingly, an inert atmosphere, e.g., nitrogen, is normally and preferably used, although air may be used if desired at the expese of loss of a proportion of the catalyst through oxidation.

When the process is a typical batch operation in the liquid phase with or without a solvent, the catalytic nickel complex is soluble to some extent at temperatures within the operable range and is usually completely soluble at the most preferred operating temperature. However, the nickel complex is essentially nonvolatile, whereas the 2-methyl-3-butenenitrile reactant and the linear pentenenitrile products are relatively volatile. Accordingly, in a continuous flow procedure the catalyst may be a component of the flowing system in a completely liquid-phase operation it may be in a mobile nonflowing liquid state in a semi-vapor phase operation, or it may be in a fixed-bed state (usually on a solid support) in a conventional flowing vapor-phase operation.

The time element in the process is not critical and can generally be governed by practical considerations. The time required for a practical level of conversion of 2-methyl-3-butenenitrile to linear pentenenitriles is dependent upon the temperature of reaction, i.e., operation at lower temperature generally requires a longer time than operation at a higher temperature. A practical reaction time can be in the range of a few seconds to many hours, depending on the particular conditions and method of operation. The rate of conversion may also be affected by the amount of excess ligands.

The molar ratio of 2-methyl-3-butenenitrile to catalyst is generally greater than 1:1, usually in the range from about 10:1 to 2000:1, for a batch operation. However, it is usually in lower proportions, e.g., 1:2, for a continuous operation with a fixed-bed catalyst.

In the hydrocyanation reactions described in copending Ser. No. 876,613, the nickel complex preferentially catalyzes formation of a six-carbon saturated nitrile (2-methylglutaronitrile) from 2-methyl-3-butenenitrile. Because of the overriding competitive hydrocyanation reaction, in the practice of the present rearrangement isomerizaion reaction it is necessary to avoid the presence of large amounts of hydrogen cyanide, i.e., any amount of the order of or in excess of 1:1 mole ratio with the 2-methyl-3-butenenitrile starting material. However, hydrogen cyanide has no significant effect per se on the isomerization reaction and its presence in minor amounts in the starting material can be tolerated if necessary. The isomerization process is preferably conducted in the absence of hydrogen cyanide. The linear pentenenitrile products are useful as intermediates to adiponitrile, which in turn is used in the manufacture of polyamides.

PREFERRED EMBODIMENTS OF THE INVENTION

There follow some nonlimiting examples illustrative of the process of the present invention. In these examples, unless otherwise noted, reaction pressures are autogenous. Analyses are made by gas chromatography and the percentages are expressed in terms of area. Gas chromatographic data expressed in area percent are approximations of weight percent. See Purnell, "Gas Chromatography, John Wiley and Sons, page 285 (1962).

The isomerizations are carried out in a 3-necked 50 ml. round bottom flask fitted with a gas inlet above the liquid level, a thermometer and a gas exit tube through a reflux condenser. Gas exit is through a bubbler to prevent contamination by air.

For operation the flask is charged with catalyst and 2-methyl-3-butenenitrile with a nitrogen purge. The system is purged with nitrogen then heated to reaction temperature. A small positive pressure of nitrogen is maintained during reaction.

The preparations of $Ni(PR_3)_3$ and $Ni(PR_3)_4$ type complexes are shown in Example 1. Examples 2–13 summarized in Table I illustrate the isomerization of 2-methyl-3-butenenitrile (2M3BN) by a nickel complex of the type $Ni(PR_3)_3$ used alone or with a promoter. The isomerization of 2M3BN by a complex of the type $Ni(PR_3)_4$ in Example 17 and by a $Ni(PR_3)_3$ complex or mixtures of $Ni(PR_3)_3$ and $Ni(PR_3)_4$ complexes with excess ligand is illustrated in Examples 14–23 (Table II). Isomerization of 2M3BN with a complex made in situ is summarized in Table III. The designations used in the tables refer to the following: 2M3BN=2-methyl-3-butenenitrile; T3PN=trans-3-pentenenitrile; C3PN=cis-3-pentenenitrile; 4PN=4 - pentenenitrile; T2PN=trans-2-pentenenitrile. The $C_5H_7O_2$ moiety in $Ni[C_5H_7O_2]_2$ of Example 26 refers to the acetylacetonate ligand.

Example 1

To a 500 ml. 3 neck, round-bottom flask, fitted with a reflux condenser, nitrogen inlet tube, glass stopper and magnetic stirrer, is charged 2.4 g. of $NiCl_2 \cdot 6H_2O$, 16.0 g. $P(C_6H_5)_3$ and 200 ml. of acetonitrile. The mixture is heated at reflux for 5 minutes, then cooled to room temperature (25° C.) and 1.3 g. of Zn dust is added. The mixture is stirred at room temperature until a deep red precipitate is formed (approximately 50 minutes). The reaction mixture is then heated at 40° C. for 1½ hours. The flask is now stoppered and transferred under inert atmosphere comprising nitrogen containing less than 5 p.p.m. of oxygen and water. The red precipitate is collected on a medium fritted funnel and washed with 40 ml. of acetonitrile. The remaining red solids are extracted with 40–50 ml. of toluene and 600 ml. of ethanol is added to the red filtrate. (A ½ gallon glass jar is ample size to contain the solvents used.) The ½ gallon jar containing the filtrate is kept in an inert atmosphere in a refrigerator and maintained at −25° C. for 16 hours. The brown solids formed in the filtrate are collected on a medium fritted funnel and then placed in a vacuum desiccator until dry.

A sample is analyzed for Ni and P. The Ni found is 6.45%; the P found is 10.36%. This corresponds to a molar ratio for Ni:P of 1:3. The compound is $Ni[P(C_6H_5)_3]_3$.

An excess of $P(C_6H_5)_3$ is added to the filtrate from the preparation described above. The filtrate is cooled in an inert atmosphere in a refrigerator at −25° C. for 16 hours. The red solids which form in the filtrate are collected on a medium fritted funnel and then placed in a vacuum desiccator until dry.

A sample is analyzed for Ni and P. The Ni found is 5.14%, the P found is 11.18%. This corresponds to a molar ratio for Ni:P of 1:4. The compound is $Ni[P(C_6H_5)_3]_4$.

I claim:

1. A process of isomerizing 2-methyl-3-butenenitrile and thereby producing at least one pentenenitrile which comprises contacting 2-methyl-3-butenenitrile at a temperature in the range of 0° C. to 250° C., with a complex having the structure $Ni(PR_3)_n$ wherein R is phenyl and n is an integer having a value of 3-4, the mole ratio of 2-methyl-3-butenenitrile to complex being at least 1:1, and recovering the linear pentenenitriles.

2. The process of claim 1 wherein there is present in addition to the complex of formula $Ni(PR_3)_n$, a compound of formula $PR_3$ wherein R is defined as in claim 1, the mole ratio of $PR_3$ to $Ni(PR_3)_n$ being at least 1:1.

3. The process of claim 1 wherein there is present, in addition to $Ni(PR_3)_n$, as a promoter, a cation of a metal selected from the group consisting of zinc, cadmium, beryllium, aluminum, gallium, indium, thallium, titanium, zirconium, hafnium, erbium, germanium, tin, vanadium, niobium, scandium, chromium, molybdenum, tungsten,

TABLE I

[Isomerization of 2-methyl-3-butenenitrile with $Ni[P(C_6H_5)_3]_3$ complex]

| Example | Complex (g.) | Promoter (g.) | 2M3BN (ml.) | Time (hrs.) | Temperature (° C.) | Products (percent) | |
|---|---|---|---|---|---|---|---|
| | | | | | | T3PN | C3PN |
| 2 | 1.6 | | 20 | 17.5 | 80 | 15.9 | |
| 3 | 1.6 | | 20 | 18 | 60 | 12.7 | |
| 4 | 1.6 | | 20 | 18 | 100 | 38.3 | |
| 5 | 1.6 | $ZnCl_2$ (0.26) | 25 | 7.5 | 100 | 27.6 | |
| 6 | 1.6 | $SnCl_2$ (0.36) | 25 | 7.5 | 100 | 14.6 | |
| 7 | 1.6 | $ZnBr_2$ (0.45) | 25 | 7.5 | 100 | 18.2 | |
| 8 | 1.5 | $B(C_6H_5)_3$ (0.48) | 25 | 22 | 80 | 11.1 | |
| 9 | 1.5 | $NiCl_2$ (0.35) | 25 | 22 | 80 | 17.8 | |
| 10 | 1.5 | | 25 | 22 | 100 | 36.1 | 0.6 |
| 11 | 1.5 | $ZnCl_2$ (0.27) | 25 | 22 | 100 | 12.1 | |
| 12 | 1.5 | $FeCl_2$ (0.26) | 25 | 22 | 100 | 26.0 | 0.2 |
| 13 | 1.5 | $CoCl_2$ (0.26) | 25 | 22 | 100 | 46.3 | 1.0 |

TABLE II

[Isomerization of 2-methyl-3-butenenitrile by nickel complex with excess ligand]

| Example | Complex (g.) | Promoter (g.) | 2M3BN (ml.) | Time (hrs.) | Temperature (° C.) | Products (percent) | |
|---|---|---|---|---|---|---|---|
| | | | | | | T3PN | C3PN |
| 14 | $Ni[P(C_6H_5)_3]_3$ (1.6) $P(C_6H_5)_3$ (0.52) | | 20 | 18 | 100 | 37.8 | |
| 15 | $Ni[P(C_6H_5)_3]_3$ (1.6) $P(C_6H_5)_3$ (1.0) | | 20 | 18 | 100 | 39.3 | |
| 16 | $Ni[P(C_6H_5)_3]_3$ (0.5) $P(C_6H_5)_3$ (0.5) | | 25 | 21 | 100 | 41.9 | 0.6 |
| 17 | $Ni[P(C_2H_5)(C_6H_5)_2]_4$ (0.5) | | 25 | 21 | 100 | 25.1 | 1.5 |
| 18 | $Ni[P(C_6H_5)_3]_3$ (1.6) $P(C_6H_5)_3$ (0.5) | $ZnCl_2$ (0.26) | 25 | 17.5 | 80 | 10.5 | |
| 19 | $Ni[P(C_6H_5)_3]_3$ (1.5) $P(C_6H_5)_3$ (0.52) | | 25 | 25 | 100 | 37.3 | 9.3 |
| 20 | Same as Ex. 19 | $ZnCl_2$ (0.27) | 25 | 25 | 100 | 60.9 | 6.4 |
| 21 | Same as Ex. 19 | $FeCl_2$ (0.26) | 25 | 25 | 100 | 57.2 | 9.1 |
| 22 | Same as Ex. 19 | $CoCl_2$ (0.26) | 25 | 25 | 100 | 65.7 | 5.2 |
| 23 | $Ni[P(C_6H_5)_3]_3$ (1.5) $P(C_6H_5)_3$ (1.3) | | 25 | 22 | 100 | 53.8 | 13.6 |

TABLE III

[Isomerization of 2-methyl-3-butenenitrile with nickel complex made in situ]

| Example | Complex (g.) | 2M3BN (ml.) | Time (hrs.) | Temperature (° C.) | Products (percent) | | | |
|---|---|---|---|---|---|---|---|---|
| | | | | | T3PN | C3PN | 4PN | T2PN |
| 24 | $NiCl_2$ (0.6) Fe (0.6) $P(C_6H_5)_3$ (5.2) | 20 | 18 | 100 | 73.6 | 8.86 | 0.4 | 0.28 |
| 25 | $NiCl_2$ (0.6) Fe (0.6) $ZnCl_2$ (0.26) $P(C_6H_5)_3$ (5.2) | 20 | 18 | 100 | 76.0 | 7.4 | 3.5 | 0.29 |
| 26 | $Ni[C_5H_7O_2]_2$ (0.6) Pb (2.0) $P(C_6H_5)_3$ (5.2) | 20 | 18 | 100 | 51.0 | 2.0 | 0.5 | 0.1 |
| 27 | $NiBr_2$ (1.1) Sn (2.0) $P(C_6H_5)_3$ (5.2) | 20 | 18 | 100 | 52.2 | 0.8 | | 0.3 |
| 28 | $NiCl_2$ (0.6) Zn (0.65) $P(C_6H_5)_3$ (5.2) | 25 | 17.5 | 80 | 17.5 | | | |
| 29 | $NiCl_2$ (0.6) Cd (1.0) $P(C_6H_5)_3$ (5.2) | 20 | 20 | 100 | 47.7 | | | |
| 30 | $NiCl_2$ (0.6) Pb (2.0) $P(C_6H_5)_3$ (5.2) | 20 | 22.5 | 100 | 52.7 | | | |
| 31 | $NiCl_2$ (0.6) Zn (0.15) $P(C_6H_5)_3$ (5.2) | 20 | 22.5 | 100 | 52.7 | | | |
| 32 | $NiCl_2$ (0.6) Mn (0.6) $P(C_6H_5)_3$ (5.2) | 20 | 22.5 | 100 | 47.7 | | | | manganese, rhenium, thorium, iron and cobalt, the mole ratio of promoter to Ni(PR$_3$)$_n$ being from about 1:20 to 50:1.

4. The process of claim 3 wherein the anion portion of the compound containing the cation is of the group consisting of fluoride, chloride, bromide, iodide, anions of lower fatty acids of from 2 to 7 carbon atoms, HPO$_3^{-2}$, H$_2$PO$_2^-$, CF$_3$COO$^-$, C$_7$H$_{15}$OSO$_2^-$ and SO$_4^{-2}$.

5. The process of claim 4 wherein the cation is of the group consisting of zinc, cadmium, titanium, tin, chromium, iron and cobalt.

6. The process of claim 2 wherein there is present, in addition to Ni(PR$_3$)$_n$ and PR$_3$, as a promoter, a cation of a metal selected from the group consisting of zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, thorium, iron and cobalt, the mole ratio of promoter to Ni(PR$_3$)$_n$ being from about 1:20 to 50:1.

7. The process of claim 5 wherein the promoter is a cation of a metal of the group consisting of zinc, cadmium, titanium, tin, chromium, iron and cobalt.

8. The process of claim 1 wherein there is present, in addition to Ni(PR$_3$)$_n$, as a promoter, a boron compound selected from the group consisting of alkali metal and tetra (lower alkyl) ammonium borohydrides, borohydrides of the structure B$_n$H$_{n+4}$ wherein $n$ is an integer of from 2 to 10 and B$_m$H$_{m+6}$ where $m$ is an integer of from 4 to 10 and organo boron compounds of the formula B(R$^1$)$_3$ where R$^1$ is selected from the group consisting of aryl radicals of from 6 to 18 carbon atoms, lower alkyl radicals and cyano substituted lower alkyl radicals.

9. The process of claim 8 wherein the organo boron compound is triphenyl borane.

10. The process of claim 1 wherein the complex Ni(PR$_3$)$_n$ is formed in situ from a divalent nickel compound, a PR$_3$ ligand wherein R is defined as in claim 1, and a reducing agent of the group consisting of magnesium, aluminum, manganese, iron, zinc, cadmium, indium, tin, cerium, thorium, calcium and alkyl aluminum compounds.

References Cited

UNITED STATES PATENTS

| | | | |
|---|---|---|---|
| 3,631,191 | 12/1971 | Kane et al. | 260—465.3 X |
| 3,536,748 | 10/1970 | Krinkard, Jr. | 260—465.9 |
| 3,564,040 | 2/1971 | Downing et al. | 260—465.3 X |
| 3,686,264 | 8/1972 | Albanese et al. | 260—465.3 |

OTHER REFERENCES

Derwent Belgian Patent Report, No. 17/69, p. 5: General Organic—p. 3, May 30, 1969 (Abstract Belgian 722,807).

JOSEPH P. BRUST, Primary Examiner

U.S. Cl. X.R.

260—465.3, 465.8